(12) United States Patent
Roy et al.

(10) Patent No.: US 12,060,450 B2
(45) Date of Patent: *Aug. 13, 2024

(54) THERMOPLASTIC POLYURETHANE

(71) Applicant: BASF SE, Ludwigshafen am Rhein (DE)

(72) Inventors: Nabarun Roy, Wyandotte, MI (US); Elmar Poeselt, Lemfoerde (DE); Dirk Kempfert, Lemfoerde (DE); Fin Lammers, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/478,701

(22) PCT Filed: Feb. 13, 2018

(86) PCT No.: PCT/EP2018/053569
§ 371 (c)(1),
(2) Date: Jul. 17, 2019

(87) PCT Pub. No.: WO2018/146335
PCT Pub. Date: Aug. 16, 2018

(65) Prior Publication Data
US 2019/0367660 A1    Dec. 5, 2019

(30) Foreign Application Priority Data

Feb. 13, 2017  (EP) ..................... 17155799

(51) Int. Cl.
| | |
|---|---|
| *C08G 18/36* | (2006.01) |
| *C08G 18/32* | (2006.01) |
| *C08G 18/48* | (2006.01) |
| *C08G 18/66* | (2006.01) |
| *C08G 18/76* | (2006.01) |

(52) U.S. Cl.
CPC ..... *C08G 18/3215* (2013.01); *C08G 18/4854* (2013.01); *C08G 18/6674* (2013.01); *C08G 18/7671* (2013.01)

(58) Field of Classification Search
None
See application file for complete search history.

(56) References Cited

U.S. PATENT DOCUMENTS

| 2002/0123601 | A1 | 9/2002 | Sonnenschein et al. | |
|---|---|---|---|---|
| 2004/0266301 | A1* | 12/2004 | Vedula | C08G 18/3206 442/327 |
| 2008/0139774 | A1 | 6/2008 | Lawrey et al. | |
| 2015/0004341 | A1 | 1/2015 | Peters | |
| 2015/0191408 | A1 | 7/2015 | Turner et al. | |
| 2017/0174818 | A1* | 6/2017 | Vonorcik, Jr. | ........ B29C 67/246 |

FOREIGN PATENT DOCUMENTS

| CN | 104004159 A | * | 8/2014 | |
|---|---|---|---|---|
| CN | 104232005 A | * | 12/2014 | |
| EP | 0 922 552 A1 | | 6/1999 | |
| EP | 0 950 674 A1 | | 10/1999 | |
| EP | 1 932 863 A2 | | 6/2008 | |
| JP | 53006399 A | * | 1/1978 | |
| JP | 09291130 A | * | 11/1997 | |
| JP | 2003147196 A | * | 5/2003 | |
| JP | 2006328221 A | * | 12/2006 | |
| WO | WO 94/20568 A1 | | 9/1994 | |
| WO | WO 98/56845 A1 | | 12/1998 | |
| WO | WO 2006/082183 A1 | | 8/2006 | |
| WO | WO 2007/082838 A1 | | 7/2007 | |
| WO | WO 2007/118827 A1 | | 10/2007 | |
| WO | WO 2014/198779 A1 | | 12/2014 | |
| WO | WO-2015148248 A1 | * | 10/2015 | ......... B29C 45/0001 |

OTHER PUBLICATIONS

International Search Report issued Apr. 13, 2018 in PCT/EP2018/053569, 3 pages.
International Preliminary Report on Patentability issued Aug. 15, 2019 in PCT/EP2018/053569, 6 pages.
Prof. Dr. Diller, W., et al.," Kunststoffhandbuch, Band 7, Polyurethane", Carl Hanser Verlag, 3. Auflage 1993, Kapitel 3.1, pp. 57-75.
"Isonate 125M Pure MDI Product Information", Mar. 1, 2011 (Mar. 1, 2011), XP055540462, Retrieved from the Internet: URL: http://msdssearch.dow.com/PublishedLiteratureDOWCOM/dh_003f/0901b8038003f14f.pdf?filepath=polyurethane/pdfs/noreg/026-00001.pdf&fromPage=GetDoc, 4 pages.
U.S. Appl. No. 15/772,947, filed May 2, 2018, US 2018-0319981 A1, Henze, O.S., et al.
U.S. Appl. No. 16/078,070, filed Aug. 21, 2018, US 2019-0300705 A1, Dabbous, R., et al.
U.S. Appl. No. 15/561,747, filed Sep. 26, 2017, US 2018-0086871 A1, Bokern, S., et al.
U.S. Appl. No. 16/086,667, filed Sep. 20, 2018, US 2019-0071535 A1, Poeselt, E., et al.

(Continued)

*Primary Examiner* — Randy P Gulakowski
*Assistant Examiner* — Ha S Nguyen
(74) *Attorney, Agent, or Firm* — Grüneberg and Myers PLLC

(57) ABSTRACT

The present invention relates to thermoplastic polyurethanes obtainable or obtained by reaction of at least one polyisocyanate composition which comprises 4,4'-MDI and at least one further polyisocyanate, at least one chain extender of general formula (I) and at least one polyol composition. The present invention further relates to a production process for such thermoplastic polyurethanes and to the use of a thermoplastic polyurethane according to the invention or of a thermoplastic polyurethane obtainable or obtained by a process according to the invention for producing extrusion products, films and molded articles.

23 Claims, No Drawings

(56) References Cited

OTHER PUBLICATIONS

U.S. Appl. No. 15/763,146, filed Mar. 26, 2018, US 2018-0265621 A1, Poeselt, E., et al.
U.S. Appl. No. 16/078,041, filed Aug. 21, 2018, US 2019-0055341 A1, Prissok, F., et al.
U.S. Appl. No. 16/348,259, filed May 8, 2019, Albuerne, J., et al.
U.S. Appl. No. 16/349,339, filed May 13, 2019, Gutmann, P., et al.
U.S. Appl. No. 16/481,709, filed Jul. 29, 2019, Roy, N., et al.

* cited by examiner

THERMOPLASTIC POLYURETHANE

The present invention relates to thermoplastic polyurethanes obtainable or obtained by reaction of at least one polyisocyanate composition which comprises 4,4'-MDI and at least one further polyisocyanate, at least one chain extender (KV1) of general formula (I) and at least one polyol composition. The present invention further relates to a production process for such thermoplastic polyurethanes and to the use of a thermoplastic polyurethane according to the invention or of a thermoplastic polyurethane obtainable or obtained by a process according to the invention for producing extrusion products, films and molded articles.

Thermoplastic polyurethanes for various applications are known in principle from the prior art. By the variation in the feedstocks, it is possible to obtain different profiles of properties.

WO 2006/082183 A1 for example discloses a process for continuous production of thermoplastically processable polyurethane elastomers wherein a polyisocyanate, a compound having Zerewittinoff-active hydrogen atoms having an average molecular weight of 450 g/mol to 5000 g/mol, a chain extender and further auxiliary and additive substances are reacted. Specific profiles of properties are achieved by means of specific processing.

EP 0 922 552 A1 also discloses a process for continuous production of granulate from thermoplastic polyurethane elastomers, wherein a granulate is initially produced by reaction of organic diisocyanates, difunctional polyhydroxyl compounds having molecular weights of 500 to 8000 and difunctional chain extenders having molecular weights of 60 to 400 in the presence of catalysts and optionally auxiliaries and/or additives. Use for producing extruded, injection molded or calendared products, in particular cable sheathings, hoses and/or films, is likewise disclosed.

WO 98/56845 discloses a thermoplastic polymer obtained by reaction of a polyisocyanate, a glycol as a chain extender and a polyether polyol. Various isocyanates, chain extenders and polyols are disclosed.

Depending on the application the properties of the thermoplastic polyurethane may be varied via the type of inputs and the employed quantity ratios. For example stability may be influenced by variation of the polyol component. Stability may also be influenced by processing, for example by heat treatment. Variation of the hard phases likewise makes it possible to influence mechanical properties and extrusion quality.

It is often the case that while the mechanical properties of a thermoplastic polyurethane are optimized the extrusion quality and thus also the optical properties of the obtained materials are inadequate.

Proceeding from the prior art it is thus an object of the present invention to provide improved materials exhibiting not only adequate mechanical properties but also good extrusion quality.

According to the invention this object is achieved by a thermoplastic polyurethane obtainable or obtained by reaction of at least the components (i) to (iii):

(i) at least one polyisocyanate composition;
(ii) at least one chain extender of general formula (I),

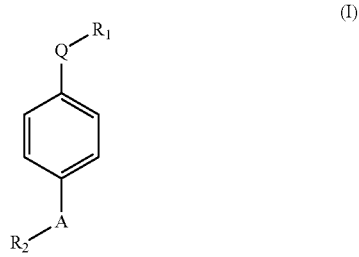

wherein A is selected from O, N(R3), S, $CH_2$,
Q is selected from O, N(R3), S, $CH_2$,
R1 is selected from $CH_2$—$(CH_2)_n$—OH, $CH(CH_3)$—$CH_2$—OH, OH,
R2 is selected from $CH_2$—$(CH_2)_n$—OH, $CH(CH_3)$—$CH_2$—OH, $CH_2$—$CH(CH_3)$—OH, OH,
n is 0, 1, 2, 3, 4, 5 or 6,
R3 is selected from $CH_3$, $CH_2$—$CH_3$,
and A and Q are not simultaneously $CH_2$,
(iii) at least one polyol composition,
wherein the polyisocyanate composition comprises 4,4'-diphenylmethane diisocyanate (4,4'-MDI) and at least one further polyisocyanate.

It has been found that, surprisingly, the inventive combination of the components (i) to (iii) made it possible to obtain thermoplastic polyurethanes exhibiting not only good mechanical properties but also improved extrusion quality. The inventive thermoplastic polyurethanes in particular exhibit an improved compression set. The optical properties of the obtained extrusion products are also markedly improved, for example through a smoother surface.

According to the invention at least the components (i) to (iii) are reacted. Employed as the chain extender (KV1) according to the invention is at least one chain extender of general formula (I),

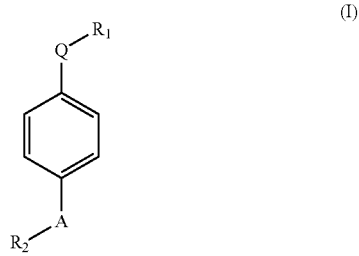

wherein A is selected from O, N(R3), S, $CH_2$ and Q is selected from O, N(R3), S, $CH_2$. The radicals R1 and R2 are alkyl radicals which may optionally be OH functionalized. R1 is selected from $CH_2$—$(CH_2)_n$—OH, $CH(CH_3)$—$CH_2$—OH, OH, and R2 is selected from $CH_2$—$(CH_2)_n$—OH, $CH(CH_3)$—$CH_2$—OH, $CH_2$—$CH(CH_3)$—OH, OH, wherein n is 0, 1, 2, 3, 4, 5 or 6, and R3 is selected from $CH_3$, $CH_2$—$CH_3$. According to the invention A and Q are not simultaneously $CH_2$.

Suitable compounds employable as chain extenders (KV1) of formula (I) are known per se to those skilled in the art. For example one suitable chain extender (KV1) is hydroquinone bis(2-hydroxyethyl)ether.

In a further embodiment the present invention thus also relates to a thermoplastic polyurethane as described hereinabove, wherein the chain extender (KV1) of general formula (I) is hydroquinone bis(2-hydroxyethyl)ether.

According to the invention the chain extender (KV1) of general formula (I) may be used alone. However, in the context of the present invention it is also possible to employ further chain extenders.

In the context of the present invention it is preferable when the proportion of the employed chain extender (KV1) of general formula (I) based on the amount of the employed chain extender is greater than 85 mol %, preferably greater than 90 mol %, more preferably greater than 95 mol %, particularly preferably greater than 98 mol %, especially preferably greater than 99 mol %.

Suitable further chain extenders (KV2) are for example compounds having at least two isocyanate-reactive functional groups, for example hydroxyl groups, amino groups or thiol groups. In a further embodiment the present invention accordingly relates to a thermoplastic polyurethane as described hereinabove, wherein at least one further chain extender (KV2) selected from the group consisting of compounds having at least two isocyanate-reactive functional groups is employed.

Suitable as further chain extenders (KV2) are for example compounds selected from the group consisting of aliphatic and aromatic diols having a molecular weight of <500 g/mol, preferably <350 g/mol. In a further embodiment the present invention also relates to a thermoplastic polyurethane as described hereinabove, wherein at least one further chain extender (KV2) selected from the group consisting of aliphatic and aromatic diols having a molecular weight of <500 g/mol, preferably <350 g/mol, is employed.

It is preferred according to the invention when diols are employed as further chain extenders (KV2). Preferably employable are aliphatic, araliphatic, aromatic and/or cycloaliphatic diols having a molecular weight of 50 g/mol to 220 g/mol. Preference is given to alkanediols having 2 to 10 carbon atoms in the alkylene radical, especially di-, tri-, tetra-, penta-, hexa-, hepta-, octa-, nona- and/or decaalkylene glycols. Particularly preferred for the present invention are 1,2-ethylene glycol, 1,4-butanediol, 1,6-hexanediol.

Also suitable as chain extenders in the context of the present invention are branched compounds such as 1,4-cyclohexyldimethanol, 2-butyl-2-ethylpropanediol, neopentyl glycol, 2,2,4-trimethyl-1,3-pentanediol, pinacol, 2-ethyl-1,3-hexanediol, 1,4-cyclohexanediol or N-phenyldiethanolamine. Likewise suitable are mixed compounds such as for example 4-aminobutanol.

It is also possible according to the invention to employ further, i.e. a third and/or fourth, chain extenders.

Also employable according to the invention are compounds having amino groups, for example diamines. Likewise employable are mixtures of diols and diamines.

The further employed chain extender (KV2) is preferably a diol having a molecular weight Mw<220 g/mol.

In one embodiment the present invention relates to a thermoplastic polyurethane as described hereinabove, wherein at least one further chain extender (KV2) selected from the group consisting of aliphatic and aromatic diols, diamines and amino alcohols is employed.

In a further embodiment the present invention relates to a thermoplastic polyurethane as described hereinabove, wherein at least one further chain extender (KV2) selected from the group consisting of monoethylene glycol, aminopropanol, 1,4-butanediol and 1,6-hexanediol is employed.

In a further embodiment it is likewise possible in the context of the present invention to employ as further chain extender (KV2) a compound of general formula (II):

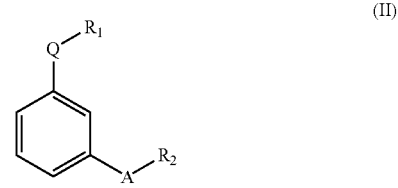

(II)

wherein A is selected from O, N(R3), S, $CH_2$,
Q is selected from O, N(R3), S, $CH_2$,
R1 is selected from $CH_2$—$(CH_2)_n$—OH, $CH(CH_3)$—$CH_2$—OH, OH,
R2 is selected from $CH_2$—$(CH_2)_n$—OH, $CH(CH_3)$—$CH_2$—OH, $CH_2$—$CH(CH_3)$—OH, OH,
n is 0, 1, 2, 3, 4, 5 or 6,
R3 is selected from $CH_3$, $CH_2$—$CH_3$.

It is preferable when the compound of general formula (II) is resorcinol bis(2-hydroxyethyl)ether. In a preferred embodiment of the present invention hydroquinone bis(2-hydroxyethyl)ether is employed as chain extender (KV1) of formula (I) and resorcinol bis(2-hydroxyethyl)ether is employed as further chain extender (KV2).

Based on the total amount of chain extender the further chain extender (KV2) is typically employed in an amount of 1% to 50%, preferably 5% to 20%. Third and/or fourth chain extenders are typically employed in amounts of less than 10% based on the amount of the employed chain extenders.

In the context of the present invention the employed amount of the chain extender and the polyol composition may be varied within wide ranges. For example the component (iii) and the component (ii) are employed in a molar ratio of (iii) to (ii) of 1 to 0.7, 1 to 2.7 and 1 to 7.3.

According to the invention the polyol composition comprises at least one polyol. Polyols are known in principle to those skilled in the art and described for example in "Kunststoffhandbuch", volume 7, "Polyurethane", Carl Hanser Verlag, 3rd edition 1993, chapter 3.1. Particularly preferably employed as polyols are polyesterols or polyetherols. Polycarbonates may likewise be employed. Copolymers too may be used in the context of the present invention. The number-average molecular weight of the polyols used according to the invention is by preference between $0.5 \times 10^3$ g/mol and $8 \times 10^3$ g/mol, preferably between $0.6 \times 10^3$ g/mol and $5 \times 10^3$ g/mol, in particular between $0.8 \times 10^3$ g/mol and $3 \times 10^3$ g/mol.

Polyetherols but also polyesterols, block copolymers and hybrid polyols such as for example poly(ester/amide) are suitable according to the invention. According to the invention preferred polyetherols are polyethylene glycols, polypropylene glycols, polyadipates, polycarbonates, polycarbonate diols and polycaprolactone.

In another embodiment the present invention also relates to a thermoplastic polyurethane as described hereinabove, wherein the polyol composition comprises a polyol selected from the group consisting of polyetherols, polyesterols, polycaprolactones and polycarbonates.

Suitable block copolymers are for example those having ether and ester blocks, for example polycaprolactone having polyethylene oxide or polypropylene oxide end blocks, and also polyethers having polycaprolactone end blocks. According to the invention preferred polyetherols are polyethylene glycols and polypropylene glycols. Polycaprolactone is also preferred.

In a particularly preferred embodiment the employed polyol has a molecular weight Mn in the range from 500 g/mol to 4000 g/mol, preferably in the range from 800 g/mol to 3000 g/mol.

In a further embodiment the present invention thus relates to a thermoplastic polyurethane as described hereinabove, wherein at least one polyol present in the polyol composition has a molecular weight Mn in the range from 500 g/mol to 4000 g/mol.

Mixtures of different polyols may also be employed according to the invention. It is preferable when the employed polyols/the polyol composition have an average functionality between 1.8 and 2.3, preferably between 1.9 and 2.2, in particular 2. It is preferable when the polyols used according to the invention have only primary hydroxyl groups.

In one embodiment of the present invention production of the thermoplastic polyurethane employs as component (iii) at least one polyol composition comprising at least polytetrahydrofuran. According to the invention the polyol composition may comprise not only polytetrahydrofuran but also further polyols.

Further polyols suitable according to the invention are for example polyethers but also polyesters, block copolymers and also hybrid polyols such as for example poly(ester/amide). Suitable block copolymers are for example those having ether and ester blocks, for example polycaprolactone having polyethylene oxide or polypropylene oxide end blocks, and also polyethers having polycaprolactone end blocks. According to the invention preferred polyetherols are polyethylene glycols and polypropylene glycols. Polycaprolactone is also preferred as a further polyol.

Suitable polyols are for example polyetherols such as polytrimethylene oxide or polytetramethylene oxide.

In a further embodiment the present invention accordingly relates to a thermoplastic polyurethane as described hereinabove, wherein the polyol composition comprises at least one polytetrahydrofuran and at least one further polyol selected from the group consisting of a further polytetramethylene oxide (PTHF), polyethylene glycol, polypropylene glycol and polycaprolactone.

In a particularly preferred embodiment the polytetrahydrofuran has a number-average molecular weight Mn in the range from 500 g/mol to 5000 g/mol, more preferably in the range from 550 g/mol to 2500 g/mol, particularly preferably in the range from 650 g/mol to 2000 g/mol.

In the context of the present invention the composition of the polyol composition may be varied within wide ranges. For example the content of the first polyol, preferably of polytetrahydrofuran, may be in the range from 15% to 85%, preferably in the range from 20% to 80%, more preferably in the range from 25% to 75%.

According to the invention the polyol composition may also comprise a solvent. Suitable solvents are known per se to those skilled in the art.

Provided that polytetrahydrofuran is employed the number-average molecular weight Mn of the polytetrahydrofuran is for example in the range from 500 g/mol to 5000 g/mol, preferably in the range from 500 to 3000 g/mol. It is more preferable when the molecular weight Mn of the polytetrahydrofuran is in the range from 500 to 1400 g/mol.

In a further embodiment the present invention also relates to a thermoplastic polyurethane as described hereinabove, wherein the polyol composition comprises a polyol selected from the group consisting of polytetrahydrofurans having a number-average molecular weight Mn in the range from 500 g/mol to 5000 g/mol.

Also employable according to the invention are mixtures of different polytetrahydrofurans, i.e. mixtures of polytetrahydrofurans having different molecular weights.

In a further embodiment the present invention therefore also relates to a thermoplastic polyurethane as described hereinabove, wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.

It is customary to employ mixtures which comprise a polytetrahydrofuran having a number-average molecular weight Mn in the range from 1501 g/mol to 3000 g/mol in an amount in the range from 5% to 30% and the polytetrahydrofuran having a number-average molecular weight Mn in the range from 500 g/mol to 1500 g/mol in an amount in the range from 2% to 50%.

According to the invention production of the thermoplastic polyurethane employs a polyisocyanate composition comprising 4,4'-MDI and at least one further polyisocyanate.

Preferred polyisocyanates in the context of the present invention are diisocyanates, in particular aliphatic or aromatic diisocyanates, more preferably aromatic diisocyanates. Suitable isocyanates are known per se to those skilled in the art.

According to the invention it is also possible for the isocyanate composition to comprise 4,4'-methylenediphenyl diisocyanate and at least one further methylenediphenyl diisocyanate. According to the invention the term "methylenediphenyl diisocyanate" is to be understood as meaning 2,2'-, 2,4'- and/or 4,4'-diphenylmethane diisocyanate or a mixture of two or three isomers. Thus employable according to the invention as the further isocyanate are 2,2'- or 2,4'-diphenylmethane diisocyanate or a mixture of two or three isomers. According to the invention the polyisocyanate composition may also comprise further polyisocyanates.

In a further embodiment the present invention also relates to a thermoplastic polyurethane as described hereinabove, wherein the polyisocyanate composition comprises a mixture of 4,4'-MDI and 2,4'-MDI.

Also employable as isocyanate components in the context of the present invention are pre-reacted products in which some of the OH components have been reacted with an isocyanate in a preceding reaction step. The obtained products are reacted with the remaining OH components in a subsequent step, the actual polymer reaction, thus forming the thermoplastic polyurethane.

Aliphatic diisocyanates employed are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylenedicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylene dicyclohexyl-diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylenedicyclohexyl diisocyanate (H12MDI); especially preferred are 4,4'-, 2,4'- and/or 2,2'-methylenedicyclohexyl diisocyanate (H12MDI) and 1-isocyanato-3,3,5-trimethyl-5-isocyanatomethylcyclohexane or mixtures thereof.

Suitable aromatic diisocyanates are in particular 1,5-naphthylene diisocyanate (NDI), 2,4- and/or 2,6-tolylene diisocyanate (TDI), 3,3'-dimethyl-4,4'-diisocyanatobiphenyl (TODI), p-phenylene diisocyanate (PDI), 4,4'-diphenylethane diisocyanate (EDI), diphenylmethane diisocyanate, 3,3'-dimethyldiphenyl diisocyanate, 1,2-diphenylethane diisocyanate and/or phenylene diisocyanate.

Particularly suitable in the context of the present invention are for example polyisocyanate compositions comprising 4,4'-MDI and 2,4-MDI, polyisocyanate compositions comprising 4,4'-MDI and 3,3'-dimethyl-4,4'-diisocyanatobiphenyl (TODI) or polyisocyanate compositions comprising 4,4'-MDI and 1,5-naphthylene diisocyanate (NDI).

It is also possible according to the invention to employ three or more isocyanates. The polyisocyanate composition typically comprises 4,4'-MDI in an amount of 2% to 50% based on the total polyisocyanate composition and the further isocyanate in an amount of 3% to 20% based on the total polyisocyanate composition.

Preferred examples of polyfunctional isocyanates are triisocyanates, for example triphenylmethane 4,4',4"-triisocyanate, and also the cyanurates of the aforementioned diisocyanates and the oligomers obtainable by partial reaction of diisocyanates with water, for example the biurets of the aforementioned diisocyanates, and oligomers obtainable by specific reaction of semi-blocked diisocyanates with polyols having on average more than two and preferably three or more hydroxyl groups.

According to the invention the polyisocyanate composition may also comprise one or more solvents. Suitable solvents are known to those skilled in the art. Suitable examples are nonreactive solvents such as ethyl acetate, methyl ethyl ketone and hydrocarbons.

Also employable in the context of the present invention are crosslinkers, for example the aforementioned polyfunctional polyisocyanates or polyols or else other polyfunctional molecules having a plurality of isocyanate-reactive functional groups. It is likewise possible in the context of the present invention to achieve crosslinking of the products through an excess of the employed isocyanate groups over the hydroxyl groups.

According to the invention the components (i) to (iii) are employed in a ratio such that the molar ratio of the sum of the functionalities of the employed polyol composition and chain extender to the sum of the functionalities of the employed isocyanate composition is in the range from 1:0.8 to 1:1.3. The ratio is preferably in the range from 1:0.9 to 1:1.2, more preferably in the range from 1:0.965 to 1:1.11, more preferably in the range from 1:0.97 to 1:1.11, more preferably in the range from 1:0.97 to 1:1.05, particularly preferably in the range from 1:0.98 to 1:1.03.

In a further embodiment the present invention relates to a thermoplastic polyurethane as described hereinabove, wherein the molar ratio of the sum of the functionalities of the employed polyol composition and chain extender to the sum of the functionalities of the employed isocyanate composition is in the range from 1:0.8 to 1:1.3.

A further parameter considered in the reaction of the components (i) to (iii) is the isocyanate index. The index is defined by the ratio of all of the isocyanate groups of component (i) employed in the reaction to the isocyanate-reactive groups, i.e. in particular the groups of the components (ii) and (iii). At an index of 1000 there is one active hydrogen atom for each isocyanate group of component (i). At indices above 1000 there are more isocyanate groups than isocyanate-reactive groups. The index in the reaction of the components (i) to (iii) is preferably in the range from 965 to 1110, for example in the range from 970 to 1110, more preferably in the range from 970 to 1050, particularly preferably in the range from 980 to 1030.

In a further embodiment the present invention relates to a thermoplastic polyurethane as described hereinabove, wherein the index in the reaction is in the range from 965 to 1100.

According to the invention further additives, for example catalysts or auxiliaries and additive, may be added during the reaction of the components (i) to (iii). Additives and auxiliaries are known per se to those skilled in the art. Combinations of two or more additives may also be employed according to the invention.

In the context of the present invention the term additive is to be understood as meaning in particular catalysts, auxiliaries and additives, in particular stabilizers, nucleating agents, release agents, demolding agents, fillers, flame retardants or crosslinkers.

Suitable additives are for example stabilizers, nucleating agents, fillers, for example silicates, or crosslinkers, for example polyfunctional aluminosilicates.

In a further embodiment the present invention accordingly relates to a thermoplastic polyurethane as described hereinabove, wherein the thermoplastic polyurethane comprises at least one additive.

Examples of auxiliaries and additives include surface-active substances, flame retardants, nucleating agents, oxidation stabilizers, antioxidants, lubricants and demolding aids, dyes and pigments, stabilizers, for example against hydrolysis, light, heat or discoloration, inorganic and/or organic fillers, reinforcers and plasticizers. Suitable auxiliaries and additives can be found, for example, in Kunststoffhandbuch, volume VII, edited by Vieweg and Höchtlen, Carl Hanser Verlag, Munich 1966 (p. 103-113).

Suitable catalysts are likewise known in principle from the prior art. Suitable catalysts are for example organic metal compounds selected from the group consisting of tin, titanium, zirconium, hafnium, bismuth, zinc, aluminum and iron organyls, for example tin organyl compounds, preferably tin dialkyl compounds such as dimethyltin or diethyltin, or tin organyl compounds of aliphatic carboxylic acids, preferably tin diacetate, tin dilaurate, dibutyltin diacetate, dibutyltin dilaurate, bismuth compounds, such as bismuth alkyl compounds or the like, or iron compounds, preferably iron(MI) acetylacetonate, or the metal salts of carboxylic acids, for example tin(II) isooctoate, tin dioctoate, titanate esters or bismuth(III) neodecanoate.

In a preferred embodiment the catalysts are selected from tin compounds and bismuth compounds, more preferably tin alkyl compounds or bismuth alkyl compounds. Tin(II) isooctoate and bismuth neodecanoate are particularly suitable.

The catalysts are typically employed in amounts of 0 to 2000 ppm, preferably 1 ppm to 1000 ppm, more preferably 2 ppm to 500 ppm and most preferably of 5 ppm to 300 ppm.

Properties of the thermoplastic polyurethanes according to the invention may be varied within wide ranges depending on the application.

The hard segment fraction in the thermoplastic polyurethanes according to the invention is typically in the range from 5% to 70%, in particular in the range from 10% to 50%, preferably in the range from 15% to 45%. In the context of the present invention the hard segment fraction is determined according to the formula disclosed in WO 2007/118827 A1.

In a further aspect the present invention also relates to a process for producing a thermoplastic polyurethane comprising the reaction of at least the components (i) to (iii):
(i) at least one polyisocyanate composition;
(ii) at least one chain extender (KV1) of general formula (I),

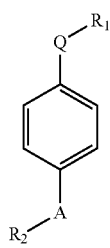

(I)

wherein A is selected from O, N(R3), S, $CH_2$,
Q is selected from O, N(R3), S, $CH_2$,
R1 is selected from $CH_2$—$(CH_2)_n$—OH, $CH(CH_3)$—$CH_2$—OH, OH,
R2 is selected from $CH_2$—$(CH_2)_n$—OH, $CH(CH_3)$—$CH_2$—OH, $CH_2$—$CH(CH_3)$—OH, OH,
n is 0, 1, 2, 3, 4, 5 or 6,
R3 is selected from $CH_3$, $CH_2$—$CH_3$,
and A and Q are not simultaneously $CH_2$,
(iii) at least one polyol composition,
wherein the polyisocyanate composition comprises 4,4'-MDI and at least one further polyisocyanate.

In respect of preferred embodiments of the process, suitable input materials or mixing ratios, reference is made to the foregoing which applies correspondingly.

The reaction of the components (i) to (iii) may in principle be performed under reaction conditions known per se. The reaction may be performed discontinuously or else continuously, for example in a belt process or a reaction extrusion process. Suitable processes are described for example in EP 0 922 552 A1 or WO 2006/082183 A1.

In a preferred embodiment the reaction of the components (i) to (iii) is carried out at temperatures higher than room temperature.

According to the invention the heating may be effected in any suitable manner known to the person skilled in the art. The input materials may preferably also be heated before addition, for example using heatable metering units.

For example in a reaction using the reaction extrusion process the reaction is managed such that the zone temperature is in the range from 170° C. to 245° C., preferably in the range from 180° C. to 235° C., more preferably in the range from 190° C. to 230° C.

In a further embodiment the present invention thus further relates to a process for producing a thermoplastic polyurethane as described hereinabove, wherein the reaction is effected using a reaction extrusion process and the zone temperature is in the range from 170° C. to 245° C.

According to the invention the process may also comprise further steps, for example a pretreatment of the components or a post-treatment of the obtained thermoplastic polyurethane. In a further embodiment the present invention thus also relates to a process for producing a thermoplastic polyurethane as described hereinabove, wherein the obtained thermoplastic polyurethane is heat-treated after the reaction.

The thermoplastic polyurethane according to the invention/a polyurethane obtained or obtainable by a process according to the invention may be used in a wide variety of ways. The thermoplastic polyurethanes according to the invention are in particular suitable for producing moldings and films. Possible applications are for example seals, sealing rings, gaskets, sealing washers, sealing agents, sealing compositions, sealants or shoe outersoles. Further applications are for example hoses for inter alia pneumatic applications, conveyor belts, films, packaging material, cables, flooring applications, shock absorbers and sound absorbers.

In a further aspect the present invention also relates to the use of a thermoplastic polyurethane as described hereinabove or of a thermoplastic polyurethane obtainable or obtained by a process according to the invention for producing extrusion products, films and molded articles, in particular for producing cable sheathings, hoses and seals.

In a further embodiment the present invention also relates to the use of a thermoplastic polyurethane as described hereinabove or of a thermoplastic polyurethane obtainable or obtained by a process according to the invention for producing extrusion products, films and molded articles, wherein the extrusion product, the film or the foil is reinforced with fillers.

It has been found that, surprisingly, the thermoplastic polyurethanes according to the invention or the thermoplastic polyurethanes obtained by a process according to the invention are well-suited to producing foamed materials. The thermoplastic polyurethanes according to the invention may be processed into foamed materials in a manner known per se. Additives such as blowing agents, cell regulators, surface-active substances, nucleating agents, fillers, hollow microspheres and/or release agents are optionally employed. Suitable processes and additives are disclosed for example in WO2014/198779 A1, in WO 2007/082838 A1 or WO 94/20568 A1.

In a further aspect the present invention accordingly also relates to the use of a thermoplastic polyurethane as described hereinabove or of a thermoplastic polyurethane obtainable or obtained by a process according to the invention for producing foamed films, foamed moldings or foamed particles and to the particle foams obtained therefrom.

In a further embodiment the present invention also relates to the use of a thermoplastic polyurethane as described hereinabove or of a thermoplastic polyurethane obtainable or obtained by a process according to the invention for producing foamed films, foamed moldings or foamed particles and to the particle foams obtainable therefrom, wherein the foamed films, foamed moldings or foamed particles and particle foams obtainable therefrom are reinforced with fillers.

In a preferred embodiment the chain extender mixture is chosen such that the TPU has a softening point below 190° C., preferably below 160° C. and very preferably below 150° C.

The softening temperature was determined by DMA (measured on a 2 mm injection molded sheet heat treated at 100° C. for 20 h) in accordance with DIN EN ISO 6721-1:2011 at a frequency of 1 Hz and a heating rate of 20 K/min measured from −80° C. to 200° C.

Further embodiments of the present invention are apparent from the claims and the examples. It will be appreciated that the features of the subject matter/processes/uses according to the invention that are recited hereinabove and elucidated hereinbelow are usable not only in the combination specified in each case but also in other combinations without departing from the scope of the invention. Thus for example the combination of a preferred feature with a particularly preferred feature or of a feature not characterized further with a particularly preferred feature etc. is also encompassed implicitly even if this combination is not mentioned explicitly.

Exemplary embodiments of the present invention are described hereinbelow but are not intended to restrict the present invention. In particular, the present invention also comprises embodiments that result from the dependency references and hence combinations specified hereinbelow.

1. A thermoplastic polyurethane obtainable or obtained by reaction of at least the components (i) to (iii):
    (i) at least one polyisocyanate composition;
    (ii) at least one chain extender (KV1) of general formula (I),

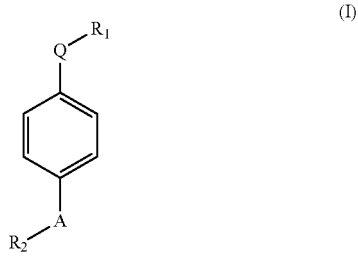

wherein A is selected from O, N(R3), S, CH$_2$,
    Q is selected from O, N(R3), S, CH$_2$,
    R1 is selected from CH$_2$—(CH$_2$)$_n$—OH, CH(CH$_3$)—CH$_2$—OH, OH,
    R2 is selected from CH$_2$—(CH$_2$)$_n$—OH, CH(CH$_3$)—CH$_2$—OH, CH$_2$—CH(CH$_3$)OH, OH,
    n is 0, 1, 2, 3, 4, 5 or 6,
    R3 is selected from CH$_3$, CH$_2$—CH$_3$,
    and A and Q are not simultaneously CH$_2$,
    (iii) at least one polyol composition,
    wherein the polyisocyanate composition comprises 4,4'-MDI and at least one further polyisocyanate.
2. The thermoplastic polyurethane according to embodiment 1, wherein the chain extender (KV1) of general formula (I) is hydroquinone bis(2-hydroxyethyl)ether.
3. The thermoplastic polyurethane according to embodiment 1 or 2, wherein at least one further chain extender (KV2) selected from the group consisting of aliphatic and aromatic diols having a molecular weight of <350 g/mol is employed.
4. The thermoplastic polyurethane according to any of embodiments 1 to 3, wherein the polyol composition comprises a polyol selected from the group consisting of polyethers, polyesters, polycaprolactones and polycarbonates.
5. The thermoplastic polyurethane according to any of embodiments 1 to 4, wherein the polyol composition comprises a polyol selected from the group consisting of polytetrahydrofurans having a number-average molecular weight Mn in the range from 500 g/mol to 5000 g/mol.
6. The thermoplastic polyurethane according to any of embodiments 1 to 5, wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.
7. The thermoplastic polyurethane according to any of embodiments 1 to 6, wherein the polyisocyanate composition comprises a mixture of 4,4'-MDI and 2,4'-MDI.
8. A thermoplastic polyurethane obtainable or obtained by reaction of at least the components (i) to (iii):
    (i) at least one polyisocyanate composition;
    (ii) at least hydroquinone bis(2-hydroxyethyl)ether as chain extender (KV1),
    (iii) at least one polyol composition,
    wherein the polyisocyanate composition comprises 4,4'-MDI and at least one further polyisocyanate.
9. A thermoplastic polyurethane obtainable or obtained by reaction of at least the components (i) to (iii):
    (i) at least one polyisocyanate composition;
    (ii) at least hydroquinone bis(2-hydroxyethyl)ether as chain extender (KV1) and at least one further chain extender (KV2) selected from the group consisting of aliphatic and aromatic diols having a molecular weight of <350 g/mol,
    (iii) at least one polyol composition,
    wherein the polyisocyanate composition comprises 4,4'-MDI and at least one further polyisocyanate.
10. A thermoplastic polyurethane obtainable or obtained by reaction of at least the components (i) to (iii):
    (i) at least one polyisocyanate composition;
    (ii) at least hydroquinone bis(2-hydroxyethyl)ether as chain extender (KV1),
    (iii) at least one polyol composition,
    wherein the polyisocyanate composition comprises 4,4'-MDI and at least one further polyisocyanate and
    wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.
11. A thermoplastic polyurethane obtainable or obtained by reaction of at least the components (i) to (iii):
    (i) at least one polyisocyanate composition;
    (ii) at least hydroquinone bis(2-hydroxyethyl)ether as chain extender (KV1) and at least one further chain extender (KV2) selected from the group consisting of aliphatic and aromatic diols having a molecular weight of <350 g/mol,
    (iii) at least one polyol composition,
    wherein the polyisocyanate composition comprises 4,4'-MDI and at least one further polyisocyanate and
    wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.

12. A thermoplastic polyurethane obtainable or obtained by reaction of at least the components (i) to (iii):
(i) at least one polyisocyanate composition;
(ii) at least one chain extender (KV1) of general formula (I),

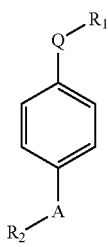

wherein A is selected from O, N(R3), S, $CH_2$,
Q is selected from O, N(R3), S, $CH_2$,
R1 is selected from $CH_2$—$(CH_2)_n$—OH, $CH(CH_3)$—$CH_2$—OH, OH,
R2 is selected from $CH_2$—$(CH_2)_n$—OH, $CH(CH_3)$—$CH_2$—OH, $CH_2$—$CH(CH_3)$—OH, OH,
n is 0, 1, 2, 3, 4, 5 or 6,
R3 is selected from $CH_3$, $CH_2$—$CH_3$,
and A and Q are not simultaneously $CH_2$,
(iii) at least one polyol composition,
wherein the polyisocyanate composition comprises 4,4'-MDI and at least one further polyisocyanate, and wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.

13. A process for producing a thermoplastic polyurethane comprising the reaction of at least the components (i) to (iii):
(i) at least one polyisocyanate composition;
(ii) at least one chain extender (KV1) of general formula (I),

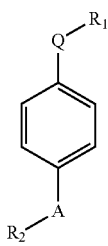

wherein A is selected from O, N(R3), S, $CH_2$,
Q is selected from O, N(R3), S, $CH_2$,
R1 is selected from $CH_2$—$(CH_2)_n$—OH, $CH(CH_3)$—$CH_2$—OH, OH,
R2 is selected from $CH_2$—$(CH_2)_n$—OH, $CH(CH_3)$—$CH_2$—OH, $CH_2$—$CH(CH_3)$—OH, OH,
n is 0, 1, 2, 3, 4, 5 or 6,
R3 is selected from $CH_3$, $CH_2$—$CH_3$,
and A and Q are not simultaneously $CH_2$,
(iii) at least one polyol composition,
wherein the polyisocyanate composition comprises 4,4'-MDI and at least one further polyisocyanate.

14. The process according to embodiment 13, wherein the chain extender (KV1) of general formula (I) is hydroquinone bis(2-hydroxyethyl)ether.

15. The process according to embodiment 13 or 14, wherein at least one further chain extender (KV2) selected from the group consisting of aliphatic and aromatic diols having a molecular weight of <350 g/mol is employed.

16. The process according to any of embodiments 13 to 15, wherein the polyol composition comprises a polyol selected from the group consisting of polyethers, polyesters, polycaprolactones and polycarbonates.

17. The process according to any of embodiments 13 to 16, wherein the polyol composition comprises a polyol selected from the group consisting of polytetrahydrofurans having a number-average molecular weight Mn in the range from 500 g/mol to 5000 g/mol.

18. The process according to any of embodiments 13 to 17, wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.

19. The process according to any of embodiments 13 to 18, wherein the polyisocyanate composition comprises a mixture of 4,4'-MDI and 2,4'-MDI.

20. A process for producing a thermoplastic polyurethane comprising the reaction of at least the components (i) to (iii):
(i) at least one polyisocyanate composition;
(ii) at least hydroquinone bis(2-hydroxyethyl)ether as chain extender (KV1),
(iii) at least one polyol composition,
wherein the polyisocyanate composition comprises 4,4'-MDI and at least one further polyisocyanate.

21. A process for producing a thermoplastic polyurethane comprising the reaction of at least the components (i) to (iii):
(i) at least one polyisocyanate composition;
(ii) at least hydroquinone bis(2-hydroxyethyl)ether as chain extender (KV1) and at least one further chain extender (KV2) selected from the group consisting of aliphatic and aromatic diols having a molecular weight of <350 g/mol,
(iii) at least one polyol composition,
wherein the polyisocyanate composition comprises 4,4'-MDI and at least one further polyisocyanate.

22. A process for producing a thermoplastic polyurethane comprising the reaction of at least the components (i) to (iii):
(i) at least one polyisocyanate composition;
(ii) at least hydroquinone bis(2-hydroxyethyl)ether as chain extender (KV1),
(iii) at least one polyol composition,
wherein the polyisocyanate composition comprises 4,4'-MDI and at least one further polyisocyanate and wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.

23. A process for producing a thermoplastic polyurethane comprising the reaction of at least the components (i) to (iii):
(i) at least one polyisocyanate composition;
(ii) at least hydroquinone bis(2-hydroxyethyl)ether as chain extender (KV1) and at least one further chain extender (KV2) selected from the group consisting of aliphatic and aromatic diols having a molecular weight of <350 g/mol,
(iii) at least one polyol composition,
wherein the polyisocyanate composition comprises 4,4'-MDI and at least one further polyisocyanate and
wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.

24. A process for producing a thermoplastic polyurethane comprising the reaction of at least the components (i) to (iii):
(i) at least one polyisocyanate composition;
(ii) at least one chain extender (KV1) of general formula (I),

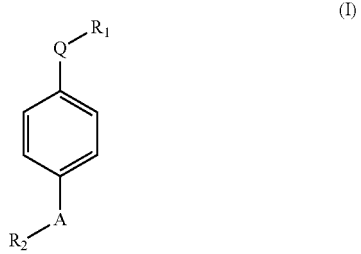

wherein A is selected from O, N(R3), S, CH$_2$,
Q is selected from O, N(R3), S, CH$_2$,
R1 is selected from CH$_2$—(CH$_2$)$_n$—OH, CH(CH$_3$)—CH$_2$—OH, OH,
R2 is selected from CH$_2$—(CH$_2$)$_n$—OH, CH(CH$_3$)—CH$_2$—OH, CH$_2$—CH(CH$_3$)OH, OH,
n is 0, 1, 2, 3, 4, 5 or 6,
R3 is selected from CH$_3$, CH$_2$—CH$_3$,
and A and Q are not simultaneously CH$_2$,
(iii) at least one polyol composition,
wherein the polyisocyanate composition comprises 4,4'-MDI and at least one further polyisocyanate,
and wherein the polyol composition comprises a polyol (P1) selected from the group consisting of polytetrahydrofurans having a number-average molecular weight Mn in the range from 1501 g/mol to 3000 g/mol and a polyol (P2) selected from the group consisting of polytetrahydrofurans having a number-average molecular weight Mn in the range from 500 g/mol to 1500 g/mol.

25. The use of a thermoplastic polyurethane according to any of embodiments 1 to 12 or of a thermoplastic polyurethane obtainable or obtained by a process according to any of embodiments 13 to 24 for producing extrusion products, films and molded articles, in particular for producing cable sheathings, hoses and seals.

26. The use according to embodiment 25, wherein the extrusion product, the film or the foil is reinforced with fillers.

27. The use of a thermoplastic polyurethane according to any of embodiments 1 to 12 or of a thermoplastic polyurethane obtainable or obtained by a process according to any of embodiments 13 to 24 for producing foamed films, foamed moldings or foamed particles and particle foams obtainable therefrom.

28. The use according to embodiment 11, wherein the foamed films, foamed moldings or foamed particles and particle foams obtainable therefrom are reinforced with fillers.

The examples which follow are intended to illustrate the invention but are in no way intended to restrict the subject matter of the present invention.

EXAMPLES 1 the Following Input Materials were Used

PTHF 1000: Polytetramethylene oxide (PTHF) Mw 1000 g/mol
PTHF 650: Polytetramethylene oxide (PTHF) Mw 650 g/mol
PTHF 2000: Polytetramethylene oxide (PTHF) Mw 2000 g/mol
HQEE: Hydroquinone bis(2-hydroxyethyl)ether
4,4'-MDI: 4,4'-diphenylmethane diisocyanate
Lupranat MI: Mixture of 4,4'-diphenylmethane diisocyanate and 2,4'-MDI (2,4'-diphenylmethane diisocyanate)
TODI: 3,3'-dimethyl-4,4'-diisocyanatobiphenyl
HER: Resorcinol bis(2-hydroxyethyl)ether
1,4-Butanediol
Irganox 1010 FF (CAS No. 6683-19-8) and 1098 (CAS No. 23128-74-7)

2 Synthesis of the Polyurethanes 2.1 Polyurethane Based on HQEE, 4,4-MDI and PTHF (Comparative Example)

800.00 g of PolyTHF1000 together with 238.84 g of HQEE were weighed into a 2 L tinplate can and briefly blanketed with nitrogen. The can was sealed with a suitable lid and heated to about 120° C. in a heating cabinet.

The liquid components in the can were mixed with a propeller stirrer on a lift. Subsequently 7.81 g of Irganox 1010 FF and 7.81 g of Irganox 1098 were added and the mixture was stirred.

The temperature of the mixture was carefully adjusted to 108° C. with a hot air gun. Addition of 505.1 g of 4,4'-MDI was carried out at 108° C. The MDI had a temperature of 45° C. Commixing was effected using a propeller stirrer at 200 rpm. Upon reaching 110° C. the reaction mixture was poured into a Teflon dish. The Teflon dish was situated on a hotplate at 125° C.

The solid slab was removed from the hotplate after 10 min and then heat treated in a heating cabinet at 80° C. for 24 h. The cooled slab was comminuted in a cutting mill. The resulting granulate was dried at 110° C. for 3 h. 2 mm and 6 mm test specimens were produced by injection molding methods.

2.2 Polyurethane Based on HQEE and a 2,4'- and 4,4'-MDI Mixture (Example 1)

800.00 g of PolyTHF1000 together with 238.84 g of HQEE were weighed into a 2 L tinplate can and briefly blanketed with nitrogen. The can was sealed with a suitable lid and heated to about 120° C. in a heating cabinet.

The liquid components in the can were mixed with a propeller stirrer on a lift. Subsequently 7.80 g of Irganox 1010 FF and 7.80 g of Irganox 1098 were added and the mixture was stirred.

The temperature of the mixture was carefully adjusted to 108° C. with a hot air gun. Addition of 479.84 g of 4,4'-MDI and 25.26 g of Lupranat MI was carried out at 108° C. The two isocyanate variants had a temperature of 45° C. Commixing was effected using a propeller stirrer at 200 rpm. Upon reaching 110° C. the reaction mixture was poured into a Teflon dish. The Teflon dish was situated on a hotplate at 125° C.

The solid slab was removed from the hotplate after 10 min and then heat treated in a heating cabinet at 80° C. for 24 h. The cooled slab was comminuted in a cutting mill. The resulting granulate was dried at 110° C. for 3 h. 2 mm and 6 mm test specimens were produced by injection molding methods.

2.3 Example 2

Production was carried out by the same production process as described in connection with example 1 but 10% Lupranat MI was used. The input materials are summarized in table 1.

2.4 Example 3

Production was carried out by the same production process as described in connection with example 1 but 20% Lupranat MI was used. The input materials are summarized in table 1.

2.5 Example 4

Production was carried out by the same production process as described in connection with example 1 but 50% Lupranat MI was used. The input materials are summarized in table 1.

TABLE 1

| Employed compounds | | | |
|---|---|---|---|
| | Example 2 | Example 3 | Example 4 |
| PolyTHF 1000 | 800.00 g | 800.00 g | 800.00 g |
| HQEE | 238.84 g | 238.84 g | 238.84 g |
| 4,4'-MDI | 454.59 g | 404.08 g | 252.55 g |
| Lupranat MI | 50.51 g | 101.02 g | 252.55 g |
| Irganox 1010 FF | 7.80 g | 7.80 g | 7.80 g |
| Irganox 1098 | 7.80 g | 7.80 g | 7.80 g |

3 Mechanical Properties

The measured values summarized in tables 2a and 2b were obtained from injection molded sheets/from extrusion products of the obtained polyurethanes.

TABLE 2a

| | Mechanical properties | | | | | |
|---|---|---|---|---|---|---|
| | Shore hardness | | Tensile strength | | Elongation at break | |
| | | | RT | 80° C. | RT | 80° C. |
| Unit | [Shore A] | [Shore D] | [MPa] | [MPa] | [%] | [%] |
| Example 1 | 95 | 52 | 37 | 17 | 480 | 620 |
| Example 2 | 94 | 51 | 35 | 15 | 410 | 550 |
| Example 3 | 94 | 50 | 34 | 15 | 410 | 490 |
| Example 4 | 92 | 46 | 34 | 11 | 470 | 570 |
| Comparative example 1 | 95 | 52 | 34 | 18 | 480 | 640 |

TABLE 2b

| | Mechanical properties | | | | | |
|---|---|---|---|---|---|---|
| | Tear propagation resistance | Abrasion | Density | Compression set | | |
| | | | | 72 h/ 23° C./ 30 min | 24 h/ 70° C./ 30 min | 24 h/ 100° C./ 30 min |
| Unit | [N/mm] | [mm³] | [g/cm³] | [%] | [%] | [%] |
| Example 1 | 92 | 60 | 1.142 | 19 | 32 | 52 |
| Example 2 | 89 | 65 | 1.142 | 20 | 32 | 51 |
| Example 3 | 89 | 69 | 1.141 | 12 | 32 | 55 |
| Example 4 | 84 | 61 | 1.139 | 23 | 36 | 55 |
| Comparative example 1 | 88 | 61 | 1.144 | 22 | 30 | 43 |

The following properties of the obtained polyurethanes were determined by the recited methods:
Hardness: DIN ISO 7619-1
Tensile strength and elongation at break: DIN 53504
Tear propagation resistance: DIN ISO 34-1, B (b)
Abrasion measurement: DIN ISO 4649
Density: DIN EN ISO 1183-1, A
Compression set DIN ISO 815

CITED LITERATURE

WO 2006/082183 A1
EP 0 922 552 A1
WO 98/56845
"Kunststoffhandbuch", volume 7, "Polyurethane", Carl Hanser Verlag, 3rd edition, 1993, chapter 3.1
WO 2007/118827 A1
EP 0 922 552 A1

WO 2006/082183 A1
WO 2014/198779 A1
WO 2007/082838 A1
WO 94/20568 A1

The invention claimed is:

1. A thermoplastic polyurethane, obtained by reaction of at least the following components (i) to (iii):
(i) at least one polyisocyanate composition;
(ii) at least one chain extender (KV1) which is hydroquinone bis(2-hydroxyethyl)ether, and
(iii) at least one polyol composition,
wherein the at least one polyisocyanate composition comprises 4,4'-diphenylmethane diisocyanate (4,4'-MDI) and at least one further polyisocyanate,
the at least one polyol composition comprises a polyol selected from the group consisting of polytetrahydrofurans having a number-average molecular weight Mn in a range of from 500 g/mol to 5000 g/mol,
a proportion of chain extender KV1 is greater than 85 mol %,
a proportion of at least one further chain extender KV2 which is an aliphatic diol, is at least 1 mol %, and
said thermoplastic polyurethane has a softening point below 160° C.

2. The thermoplastic polyurethane of claim 1, wherein said at least one further chain extender (KV2) is selected from the group consisting of aliphatic diols having a molecular weight of <350 g/mol.

3. The thermoplastic polyurethane of claim 1, wherein the at least one polyol composition further comprises a polyol selected from the group consisting of polyethers, polyesters, polycaprolactones and polycarbonates.

4. The thermoplastic polyurethane of claim 1, wherein the at least one polyol composition further comprises a polyol (P1) selected from the group consisting of polytetrahydrofurans having a number-average molecular weight Mn in a range from 1501 g/mol to 3000 g/mol and a polyol (P2) selected from the group consisting of polytetrahydrofurans having a number-average molecular weight Mn in a range from 500 g/mol to 1500 g/mol.

5. The thermoplastic polyurethane of claim 1, wherein the at least one polyisocyanate composition comprises a mixture of 4,4'-diphenylmethane diisocyanate (4,4'-MDI) and 2,4'-diphenylmethane diisocyanate (2,4'-MDI).

6. A process for producing a thermoplastic polyurethane, the process comprising reacting at least the following components (i) to (iii):
(i) at least one polyisocyanate composition;
(ii) at least one chain extender (KV1 which is hydroquinone bis(2-hydroxyethyl)ether, and
(iii) at least one polyol composition,
wherein the polyisocyanate composition comprises 4,4'-diphenylmethane diisocyanate (4,4'-MDI) and at least one further polyisocyanate,
the at least one polyol composition comprises a polyol selected from the group consisting of polytetrahydrofurans having a number-average molecular weight Mn in a range of from 500 g/mol to 5000 g/mol,
a proportion of chain extender KV1 is greater than 85 mol %,
a proportion of at least one further chain extender KV2 which is an aliphatic diol, is at least 1 mol %, and
said thermoplastic polyurethane has a softening point below 160° C.

7. An extrusion product, film or molded article, comprising the thermoplastic polyurethane of claim 1.

8. The extrusion product, film or molded article of claim 7, which is reinforced with fillers.

9. The extrusion product, film or molded article of claim 7, which is a cable sheathing, hose or seal.

10. An extrusion product, film or molded article, comprising a thermoplastic polyurethane obtained by the process of claim 6.

11. The extrusion product, film or molded article of claim 10, which is reinforced with fillers.

12. The extrusion product, film or molded article of claim 10, which is a cable sheathing, hose or seal.

13. A foamed film, foamed molding or foamed particle, or a particle foam obtained therefrom, comprising the thermoplastic polyurethane of claim 1.

14. The foamed film, foamed molding or foamed particle, or the particle foam obtained therefrom, of claim 13, which is reinforced with fillers.

15. The foamed film, foamed molding or foamed particle, or a particle foam obtained therefrom, comprising a thermoplastic polyurethane obtainable or obtained by the process of claim 6.

16. The foamed film, foamed molding or foamed particle, or the particle foam obtained therefrom, of claim 15, which is reinforced with fillers.

17. The thermoplastic polyurethane of claim 1, comprising greater than 90 mol % of chain extender KV1.

18. The thermoplastic polyurethane of claim 1, comprising greater than 95 mol % of chain extender KV1.

19. The thermoplastic polyurethane according to claim 1, wherein the thermoplastic polyurethane has a softening point below 150° C.

20. A thermoplastic polyurethane obtained by reaction of at least the following components (i) to (iv):
(i) at least one polyisocyanate composition;
(ii) at least one chain extender (KV1) of general formula (I),

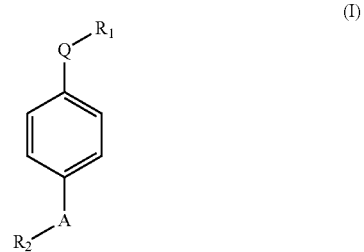

wherein A is selected from O, N(R3), S and $CH_2$,
Q is selected from O, N(R3), S and $CH_2$,
R1 is selected from $CH_2$—$(CH_2)_n$—OH, $CH(CH_3)$—$CH_2$—OH and OH,
R2 is selected from $CH_2$—$(CH_2)_n$—OH, $CH(CH_3)$—$CH_2$—OH, $CH_2$—$CH(CH_3)$—OH and OH,
n is 0, 1, 2, 3, 4, 5 or 6,
R3 is selected from $CH_3$ and $CH_2$—$CH_3$,
and A and Q are not simultaneously $CH_2$,
(iii) at least one polyol composition, and
(iv) at least one further chain extender KV2 selected from the group consisting of compounds having at least two isocyanate-reactive functional groups,
wherein the at least one polyisocyanate composition comprises 4,4'-diphenylmethane diisocyanate (4,4'-MDI) and at least one further polyisocyanate, the at least one polyol composition comprises a polyol selected from the group consisting of polytetrahydrofurans having a number-average molecular weight Mn in a range of from 500 g/mol to 5000 g/mol,
wherein the proportion of chain extender KV1 is greater than 98 mol %.

21. The thermoplastic polyurethane according to claim 20, wherein the proportion of chain extender KV1 is greater than 99 mol %.

22. The thermoplastic polyurethane according to claim 1, wherein the least one polyisocyanate composition comprises an amount of 2-50 wt. % of 4,4'-MDI and 3-20 wt. % of a further isocyanate.

23. The thermoplastic polyurethane according to claim 1, wherein component (iii) and component (ii) are employed in a molar ratio of (iii) to (ii) of 1:0.7 to 7.3.

* * * * *